United States Patent Office 2,744,911
Patented May 8, 1956

2,744,911

PYRAZOLONES AND PROCESS FOR THEIR MANUFACTURE

Hans Bolliger, Basel, Switzerland, assignor to Ciba Limited, Basel, Switzerland, a Swiss firm No Drawing. Application January 25, 1954,
Serial No. 406,088

Claims priority, application Switzerland January 28, 1953

9 Claims. (Cl. 260—310)

The present invention is based on the observation that new and valuable pyrazolones are obtained when an arylhydrazine of which the aryl radical contains an acylated sulfonic acid amide group, is condensed with an agent effecting pyrazolone ring-closure.

As such an agent there come into consideration compounds which are condensable with hydrazines to form 3-methyl-5-pyrazolones, such as diketene and acetoacetic acid derivatives, for example acetoacetic acid amides or esters, more especially an acetoacetic acid ester of an aliphatic alcohol of low molecular weight such as acetoacetic acid methyl- or ethyl ester.

The arylhydrazines with an acylated sulfonic acid amide group, used as starting material, may contain the hydrazine group (—NHNH$_2$) and the acylated sulfonic acid amide group bound to any aryl radical, but preferably to an aryl radical of the benzene series. As an acylated sulfonic acid amide group there come into consideration sulfonic acid amide groups in which a hydrogen atom of the —SO$_2$NH$_2$— group is replaced by an acyl radical, advantageously by one containing as an acyl radical the radical of an organic sulfonic acid, preferably an alkane sulfonyl- (e. g. ethane sulfonyl) radical or a benzene sulfonyl radical. In addition to such an acylated sulfonic acid amide group and the hydrazine group, the aryl radical of the hydrazine compound concerned may contain further substituents of a water-insolubilizing kind, such as alkyl or alkoxy groups, halogen atoms or nitro groups. These arylhydrazines can be prepared from the appropriate arylamines by methods in themselves known by diazotization and reduction, for example with alkali bisulfites or stannous chloride. As examples of arylhydrazines thus obtained there may be mentioned: 1-hydrazinobenzene-3-sulfonic acid-N-(benzoyl)-amide, 1-hydrazinobenzene-3-sulfonic acid-N-(benzene sulfonyl)-amide, 1-hydrazinobenzene-4-sulfonic acid - N - (benzene sulfonyl)-amide, 1-hydrazinobenzene-4-sulfonic acid-N-(para-toluene sulfonyl)-amide, 2 - chloro-1-hydrazinobenzene-5-sulfonic acid-N-(benzene sulfonyl)-amide, 2:6-dichloro-1-hydrazinobenzene-4-sulfonic acid-N-(benzene sulfonyl)-amide, 2:5-dichloro-1-hydrazinobenzene-4-sulfonic acid-N - (benzene sulfonyl)-amide, 4-chloro-1-hydrazinobenzene-5-sulfonic acid-N-(benzene sulfonyl)-amide, 1 - hydrazinobenzene - 3 - sulfonic acid-N -(para-chlorobenzene sulfonyl)-amide, 1-hydrazinobenzene-3-sulfonic acid-N-(2':5'-dichlorobenzene sulfonyl)-amide, 1-hydrazinobenzene-3-sulfonic acid - N-(3':4'-dichlorobenzene-sulfonyl)-amide, 4-methyl - 1 - hydrazinobenzene-3-sulfonic acid-N-(2':5'-dichlorobenzene-sulfonyl)-amide, 1-hydrazinobenzene-3- or -4-sulfonic acid-N-(ethane sulfonyl)-amide.

The condensation of these hydrazine compounds with an acetoacetic acid derivative can, if desired, be carried out in an organic solvent or advantageously in an aqueous medium. The reaction is carried out advantageously in a nearly neutral to weakly acid medium, for example by adding acetic acid and alkali acetates, when using an acetoacetic acid amide, whilst in the case of acetoacetic acid esters the reaction is preferably carried out in the presence of alkalis, for example sodium carbonate or sodium hydroxide.

In most cases condensation begins at a low temperature, for example at room temperature. It is usually carried out however by heating the reaction mixture, for example to boiling point of the reaction mixture.

The pyrazolones obtained are now. They contain an aryl radical with an acylated sulfonic acid amide group, preferably one of the formula

—SO$_2$—NH—SO$_2$—X in which X represents a saturated aliphatic hydrocarbon radical or a benzene radical. These pyrazolones, more especially the 1-aryl-3-methyl-5-pyrazolones of this kind, are valuable intermediate products, particularly for the manufacture of azo-dyestuffs.

It is in many respects surprising that the present process works so smoothly, particularly because it could be expected that the acylated sulfonic acid amide group would be hydrolysed under the mentioned reaction conditions.

The following examples illustrate the invention, the parts and percentages being by weight unless otherwise stated and the relationship of parts by weight to parts by volume being the same as that of the kilogram to the liter:

*Example 1*

31.2 parts of 3-aminobenzene-1-sulfonic acid-N-(benzene-sulfonyl)-amide are dissolved in 125 parts of watr while adding 5.3 parts of anhydrous sodium carbonate. After the addition of 6.9 parts of sodium nitrite, the mixture is entered, while stirring thoroughly, into a mixture of 100 parts of ice and 10 parts by volume of sulfuric acid ($d=1.8$). After 20 minutes the precipitated diazonium compound is filtered off rapidly and introduced into an ice-cold mixture of 45 parts by volume of a sodium bisulfite solution (containing 550 grams of NaHSO$_3$ per liter of solution), 22 parts by volume of a sodium hydroxide solution of 30% strength and 30 parts by volume of water. The whole is stirred for an hour at 0 to 5° C., 2 hours at 20° C., heated to the boil and 70 parts by volume of hydrochloric acid ($d=1.18$) are added dropwise in the course of half an hour. After a further 20 minutes at 95° C. the whole is cooled to 20° C. and filtered. The crystalline precipitate is dissolved in 150 parts by volume of water with the addition of 5.3 parts of anhydrous sodium carbonate. After adding 13 parts by volume of aceto acetic acid ethyl ester dropwise, the whole is heated at the boil for an hour. 18 parts by volume of hydrochloric acid ($d=1.18$) are then added dropwise to the hot solution and allowed to cool while stirring. After filtering and drying there is obtained the 1-phenyl-3-methyl-5-pyrazolone-3'-sulfonic acid-N-(benzene sulfonyl)-amide of the formula

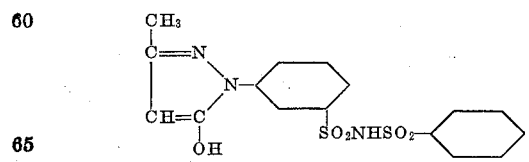

which can be recrystallized from much water for purification. The new product is a faintly yellowish colored powder which forms a yellow water-soluble dyestuff in a weakly alkaline aqueous solution with phenyl-diazonium chloride.

Example 2

264 parts of 4-aminobenzene-1-sulfonic acid-N-(ethane sulfonyl)-amide are heated in 250 parts of water with 230 parts by volume of hydrochloric acid ($d=1.18$) to 60° C., 700 parts of ice are added and, while stirring vigorously, a solution of 69 parts of sodium nitrite in 200 parts of water is added dropwise in the course of 10 minutes. The whole is then stirred for a further ½ hour at +5° C. and the suspension is slowly added dropwise, while stirring, to a mixture of 450 parts by volume of sodium bisulfite solution (550 grams of $NaHSO_3$ per liter of solution), 200 parts by volume of a sodium hydroxide solution of 30 per cent. strength and 450 parts of ice. Thereupon the whole is stirred for a further 2 hours at 15° C.; the pH should be adjusted to 7–9, if necessary by adding hydrochloric acid. The almost colorless solution is then concentrated to about half at 70–80° C. under reduced pressure, 260 parts by volume of hydrochloric acid ($d=1.18$) are added and the whole is heated for an hour at 90° C. After cooling to 50° C., the pH is adjusted to 7–8 by first adding 220 parts by volume of sodium hydroxide solution of 30 per cent strength and then with 120 parts of anhydrous sodium carbonate. After the addition of a further 60 parts of anhydrous sodium carbonate and 140 parts by volume of aceto acetic acid methyl ester the whole is heated for 1½ hours at 90–95° C. while stirring and 130 parts by volume of hydrochloric acid ($d=1.18$) are added to the clear solution. The whole is allowed to cool slowly while stirring, filtered cold and dried. There is obtained the 1-phenyl-3-methyl-5-pyrazolone-4'-sulfonic acid-N-(ethane sulfonyl)-amide of the formula

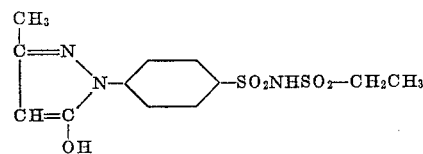

which can be recrystallized from much water for purification. The new product is a faintly yellowish colored powder which forms a yellow water-soluble dyestuff in a weakly alkaline aqueous solution with phenyl diazonium chloride.

In the following table further pyrazolone derivatives are listed which were prepared according to the methods described in Example 1 or Example 2.

| | Starting Material | Pyrazolone | Method |
|---|---|---|---|
| 1 | $NH_2$-C6H4-$SO_2NHSO_2$-$C_2H_5$ | 1-phenyl-3-methyl-5-pyrazolone with $SO_2NHSO_2$-$C_2H_5$ | Example 2. |
| 2 | $NH_2$-C6H4-$SO_2NHSO_2$-C6H5 | 1-phenyl-3-methyl-5-pyrazolone with $SO_2NH$-$SO_2$-C6H5 | Example 1. |
| 3 | Cl-C6H3($NH_2$)-$SO_2NHSO_2$-C6H5 | 1-(Cl-phenyl)-3-methyl-5-pyrazolone with $SO_2NHSO_2$-C6H5 | Do. |
| 4 | $NH_2$-C6H2(Cl)(Cl)-$SO_2NHSO_2$-C6H5 | 1-(diCl-phenyl)-3-methyl-5-pyrazolone with $SO_2NHSO_2$-C6H5 | Do. |
| 5 | $NH_2$-C6H2(Cl)(Cl)-$SO_2NHSO_2$-C6H5 | 1-(diCl-phenyl)-3-methyl-5-pyrazolone with $SO_2NHSO_2$-C6H5 | Do. |
| 6 | $NH_2$-C6H3(Cl)-$SO_2NHSO_2$-C6H5 | 1-(Cl-phenyl)-3-methyl-5-pyrazolone with $SO_2NHSO_2$-C6H5 | Do. |
| 7 | $NH_2$-C6H4-$SO_2NHSO_2$-C6H4-Cl | 1-phenyl-3-methyl-5-pyrazolone with $SO_2NHSO_2$-C6H4-Cl | Do. |

| | Starting Material | Pyrazolone | Method |
|---|---|---|---|
| 8 | H₂N–C₆H₄–SO₂NHSO₂–C₆H₃Cl₂ | pyrazolone structure | Do. |
| 9 | H₂N–C₆H₄–SO₂NHSO₂–C₆H₃Cl₂ | pyrazolone structure | Do. |
| 10 | CH₃, NH₂ substituted benzene–SO₂NHSO₂–C₆H₃Cl₂ | pyrazolone structure | Do. |

Whereas the formulae in the preceding specification and in the appended claims are written in the enolic form, it is to be understood that the tautomeric ketonic form thereof is to be included as well.

What is claimed is:

1. A 5-pyrazolone of the formula

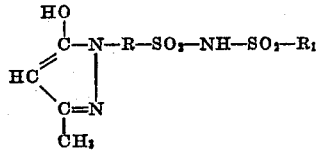

wherein R represents a member selected from the group consisting of the benzene and chlorobenzene radicals and $R_1$ represents a member selected from the group consisting of the benzene and chlorobenzene radicals and the saturated lower aliphatic hydrocarbon radicals.

2. A 5-pyrazolone of the formula

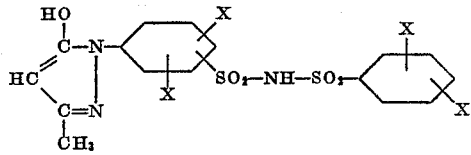

wherein two of the X's represent chlorine atoms and the other two hydrogen atoms.

3. The 5-pyrazolone of the formula

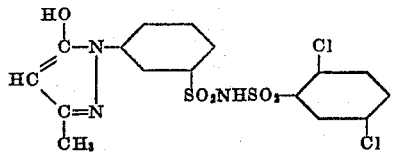

4. The 5-pyrazolone of the formula

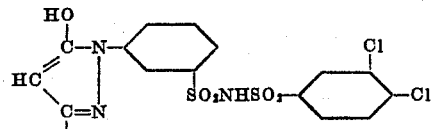

5. The 5-pyrazolone of the formula

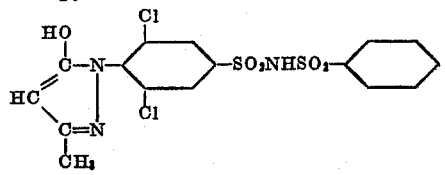

6. The 5-pyrazolone of the formula

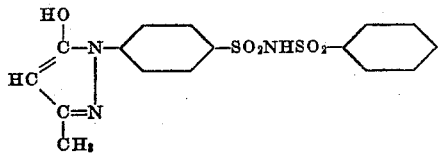

7. The 5-pyrazolone of the formula

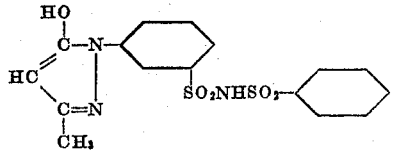

8. A process for the manufacture of a 5-pyrazolone wherein an arylhydrazine of the formula $$H_2N-NH-R-SO_2-NH-SO_2-R_1$$

wherein R represents a member selected from the group consisting of the benzene and chlorobenzene radicals and $R_1$ represents a member selected from the group consisting of the benzene and chlorobenzene radicals and the saturated lower aliphatic hydrocarbon radicals is heated with an acetoacetic acid ester of an aliphatic saturated alcohol containing up to two carbon atoms in an alkaline aqueous medium.

9. A process for the manufacture of a 5-pyrazolone wherein an arylhydrazine of the formula $$H_2N-NH-R-SO_2-NH-SO_2-R_1$$

wherein R represents a member selected from the group consisting of the benzene and chlorobenzene radicals and $R_1$ represents a member selected from the group consisting of the benzene and chlorobenzene radicals and the saturated lower aliphatic hydrocarbon radicals, and an acetoacetic acid ester of an aliphatic saturated alcohol containing up to two carbon atoms are heated together in an alkaline aqueous medium at the boiling temperature of the reaction mixture.

References Cited in the file of this patent

UNITED STATES PATENTS 2,518,078    Schmid et al. _____ Aug. 8, 1950